US012695956B2

(12) United States Patent
Gilmore, III et al.

(10) Patent No.: US 12,695,956 B2
(45) Date of Patent: Jul. 28, 2026

(54) SYSTEM FOR SYNCHRONIZATION OF CAPTIONING TO SMART DEVICES

(71) Applicants:Darwin Gilmore, III, Pasadena, CA (US); Jesse Garrison, Glendale, CA (US)

(72) Inventors: Darwin Gilmore, III, Pasadena, CA (US); Jesse Garrison, Glendale, CA (US)

( * ) Notice: Subject to any disclaimer, the term of this patent is extended or adjusted under 35 U.S.C. 154(b) by 0 days.

(21) Appl. No.: 19/117,960

(22) PCT Filed: Apr. 4, 2024

(86) PCT No.: PCT/US2024/023163
§ 371 (c)(1),
(2) Date: Apr. 2, 2025

(87) PCT Pub. No.: WO2024/211635
PCT Pub. Date: Oct. 10, 2024

(65) Prior Publication Data
US 2026/0129266 A1 May 7, 2026

Related U.S. Application Data

(60) Provisional application No. 63/494,398, filed on Apr. 5, 2023.

(51) Int. Cl.
*H04N 21/485* (2011.01)
*H04N 21/214* (2011.01)
(Continued)

(52) U.S. Cl.
CPC ..... *H04N 21/4856* (2013.01); *H04N 21/2143* (2013.01); *H04N 21/41407* (2013.01); *H04N 21/43074* (2020.08)

(58) Field of Classification Search
CPC ........... H04N 21/4856; H04N 21/2143; H04N 21/41407; H04N 21/43074
See application file for complete search history.

(56) References Cited

U.S. PATENT DOCUMENTS

2016/0196577 A1* 7/2016 Reese ................... H04W 4/023
705/14.5
2019/0089757 A1* 3/2019 Sorensen ................ G06F 21/62
(Continued)

*Primary Examiner* — Oschta I Montoya
(74) *Attorney, Agent, or Firm* — Nolan Heimann LLP; Adam Diament

(57) ABSTRACT

An automatic personal enhancement system that is tailored to each user's special access needs. The system having a multimedia presentation device, an onsite node having a user protocol time code message protocol, and the system sending a real-time time-code to the system, over a private LAN, a transmission device to transmit information to the onsite node, a fleet management subsystem, a content database server, a smart device, and a web server. The web server having instructions for: identifying a user entering a venue; connecting to the show control subsystem; selecting a language for multimedia pretensions from the show control subsystem; tracking the user's smart device with the personal enhancement system for automatically playing multimedia associated with the location in the venue in proximity to the user's smart device; and stopping the tracking and disconnecting the personal enhancement system from the user's smart device after the user exits the venue.

18 Claims, 4 Drawing Sheets

(51) Int. Cl.
   *H04N 21/414*        (2011.01)
   *H04N 21/43*         (2011.01)

(56)                References Cited

U.S. PATENT DOCUMENTS

2022/0360844  A1 *  11/2022  Arana  .................... G11B 27/10
2024/0386065  A1 *  11/2024  Ensing  ................ G01C 21/206

* cited by examiner

SYSTEM FOR SYNCHRONIZATION OF CAPTIONING TO SMART DEVICES

CROSS-REFERENCE TO RELATED APPLICATIONS

This application claims the benefit under 35 U.S.C. § 119 (e) of U.S. Provisional Patent Application Ser. No. 63/448, 673, filed on 5 Apr. 2023, the contents of which are incorporated herein by reference in their entirety. The Application also claims the benefit of PCT patent application Serial No. PCT/US24/23163, filed on Apr. 4, 2024, the contents of which are incorporated herein by reference in their entirety.

FIELD OF THE INVENTION

The present invention is in the technical field of enhancement systems and more particularly to an automatic personal enhancement system that is tailored to each user's special access needs using hardware that a user already possesses and is familiar, without additional software.

BACKGROUND

Currently, when a user is at an immersive entertainment experience, such as a projection mapped site activation or museum installation, many individual audience members do not have sufficient accessibility to the attraction. One of the most common barriers is language.

There are currently many different concepts about how to handle closed captions in entertainment environments. Many systems require a specific hardware placed near the end user. Such as, for example, a teleprompter or a custom handheld device. There are a few smart device application that attempt to provide a solution, but the point of entry for the user is more difficult. In addition many of the application based solutions do not connect a show control network in order to eliminate the need for an operator. This increases the cost and complexity of the proposed solution.

Additionally, pre-existing subtitle systems for captioning or other user enhancements require: 1) displaying text over the content, referred to as open enhancement, or 2) an investment in specific compatible hardware, such as screens, headsets, etc., or 3) having the user download an application that they are unfamiliar with and must learn to use before accessing any enhancements. Moreover, many of the current systems require handing out custom hardware to guests. This is wasteful in resources need to hand out, recover and clean the hardware between each use. Also, the hardware solutions are generally not upgradeable and the hardware ages out quickly with advancements in electronics. This is cost prohibitive for most venues and can be confusing for the users. The application downloading can be both intimidating and frustrating for many users.

Therefore, there is a need for an automatic personal enhancement system that is tailored to each user's special access needs using hardware that a user already possesses and is familiar, without additional software, overcoming the limitations of the prior art.

SUMMARY

The present invention overcomes the limitations of the prior art by providing an automatic personal enhancement system that is tailored to each user's special access needs. The system has at least one multimedia presentation device, at least one on-site node that has a user protocol time code message protocol, and that sends a real-time time-code to the system over a private local area network. There is also at least one transmission device operably connected to the at least one on-site node, where the at least one transmission device is configured to transmit information wired, wireless, or both wired and wireless. A fleet management subsystem is also provided and is operably connected to the at least one transmission device. At least one content database server is also operably connected to the fleet management subsystem. And at least one web server is operably connected to the fleet management subsystem and the at least one content database server. The at least one web server has instructions operable on one or more than one processor for: 1) identifying a user entering a venue equipped with the system; 2) connecting to the show control subsystem; 3) selecting a language for multimedia pretensions from the show control subsystem; 4) tracking the user's smart device the personal enhancement system for automatically playing multimedia associated with the location in the venue in proximity to the user's smart device; and 5) exiting the venue, wherein tracking is stopped and the personal enhancement system disconnects from the user's smart device. At least one user's smart device operably connected to the at least one web server. The system also has an application program interface for receiving time codes, interfacing with the at least one content database and outputting multimedia to the user's smart device.

The system further comprises instructions for at least one presentation device-less application program interface to connect users to the system without additional software to be added to the at least one smart device, and wherein the users connect to the at least one web server by scanning a QR code, a bar code or a RFID tag or an NFC device. The user can then select a language that opens a streaming connection to the application program interface and the show control subsystem.

The system provides other user assistance options so that any user is able to maximize the personal experience at the venue, where the other user assistance options are selected from the group consisting of closed captioning, volume, and vibration. The system can make a direct connection between the user's smart device and the user's hearing aides, or visual aides. Additionally, the user can manually active or deactivate the automatic personalized enhancements. Impaired users that are deaf, hard of hearing, or blind can receive emergency alerts using the show control subsystem presenting auditory, vibratory and visual alerts. Both impaired and non-impaired users non-impaired users are informed of any emergency situation and where to go or how to proceed as an additional communication method for the venue.

The system is automatic and operates without an operator and delivers multimedia content enhancements for both impaired and non-impaired users, along with translation services directly to the user's smart device without the need of downloading an extra application to the smart device. Prior to exiting the venue, gifts, tickets, discounts and other offers can be displayed to the user on the smart device for immediate purchase or redemption at a later date.

The system also has instructions for: interpreting timing based solely on listening to an incoming audio feed; synchronizing a media source with subtitles or other associated content without the need for onsite node programming or networking, where programming isn't feasible due to complexity, cost, where security is a concern due to legacy media, and where digital time codes are not an available;

ingesting target media in advance; dividing the target media it into snippets; creating metadata from the snippets; uploading the metadata to a data server; and at least one onsite node then downloads the snippets and metadata and begins listening to incoming audio over its analog input port, wherein the system regularly samples an incoming audio stream and compares the sample to a library of snippets to develop a confidence rating using a cross-correlation algorithm, and wherein the system outputs a time code of the moment of highest correlation across all of the snippets.

The at least one onsite node rate-limits and standardizes messages and transmits them to the application program interface on the at least one web server. The onsite node also has instructions operable on one or more than one processor to send a time code to a specific local internet protocol address for the user to access on the one or more than one smart device, rate-limit and standardize messages and transmits the messages to an application program interface; and transmit an industry standard time code from preexisting on-site nodes to cloud-based application program interface hosted on a least one at least one presentation device, to synchronize the system across multiple physical locations. When the application program interface receives a new time-code, a multimedia file stored in the at least one content database server is propagated to the users connected smart device. The multimedia file is coincident with the venue location.

The fleet management subsystem comprises instructions operable on one or more than on processor for a secure container-based technology stack that enables a subtext manager to deploy, manage, and scale fleets of internet of things devices.

A user connects to the show control subsystem by scanning a code provided by the venue with a user's smart device. Preferably, the connection to the show control subsystem is wireless.

There is also provided a method for using the automatic personal enhancement system that is tailored to each user's special access needs. The method comprises the steps of first entering a venue equipped with the system. Then, connecting to the show control subsystem, wherein the connection can be made by scanning a code provided by the venue with a user's smart device. Next, selecting a language for multimedia pretensions from the show control subsystem. Then, tracking the user's smart device the personal enhancement system for automatically playing multimedia associated with the location in the venue in proximity to the user's smart device. Finally, exiting the venue, wherein tracking is stopped and the personal enhancement system disconnects from the user's smart device.

BRIEF DESCRIPTION OF THE DRAWINGS

The present invention overcomes the limitations of the prior art by providing an automatic personal enhancement system that is tailored to each user's special access needs (language/text size, etc.) using hardware that a user already possesses and is familiar, without additional software. The present invention, a user scans a code with a smart device that then prompts the user to select the user's desired language. After the selection is made, the user's smart device will automatically synchronize with the venue's show control subsystem to provide real-time captions to help users better experience the venue.

These and other features, aspects and advantages of the present invention will become better understood with regard to the following description, appended claims, and accompanying figures where:

DETAILED DESCRIPTION OF THE INVENTION

Figure 1:
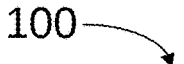
FIG. 1 is a diagram of an automatic personal enhancement system that is tailored to each user's special access needs using hardware that a user already possesses and is familiar, without additional software, according to one embodiment of the present invention, FIG. 2. is a flowchart diagram of a user experience using the system of FIG. 1.
Figure 1:
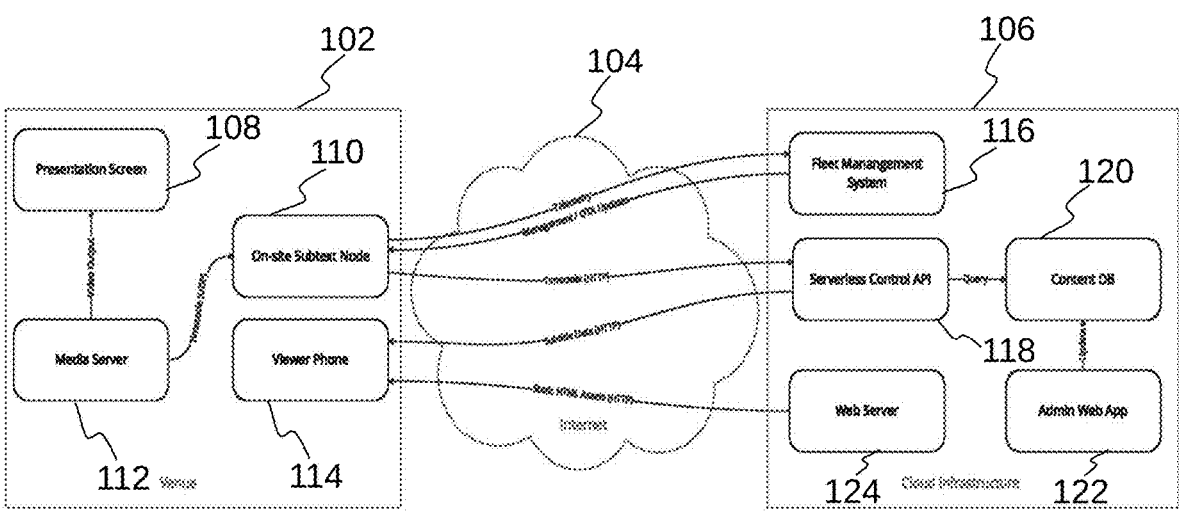

The present invention overcomes the limitations of the prior art by providing an automatic personal enhancement system that is tailored to each user's special access needs whether that is language/text size, audio, etc. using hardware that the user already possesses and is familiar, without additional software. The invention is a digital tool that synchronizes with an entertainment venue to provide special access needs, such as, captions to each individual audience member via their smart device without requiring a downloadable app. Additionally, the present invention does not require an operator at the venue to run the enhancement software. In one aspect of the invention, access to the one or more than one user selected enhancement is provided in environments it is needed, but where it is difficult to have in the traditional way.

Many users at an immersive entertainment experience, such as a projection mapped site activation or museum installation, want a more robust means of accessibility and interaction with the venue. One of the most common barriers is language. Other barriers such as hearing loss or attention span problems can also be solved with the present invention.

To use the present invention, a user scans a code with a smart device that prompts the user to to select a desired language. After selecting a language, and any other user selectable options, the smart device will automatically synchronize with the venue's show control subsystem to provide real-time enhancements to help the user better experience the venue.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a system or device disclosed in this disclosure will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. The flowcharts and block diagrams in the figures can illustrate the architecture, functionality, and operation of possible implementations of systems, methods and computer programs according to various embodiments disclosed. In this regard, each block in the flowchart or block diagrams can represent a module, a subsystem, a segment, or a portion of code, that can comprise one or more executable instructions for implementing the specified logical function(s). It should also be noted that, in some alternative implementations, the functions noted in the blocks may occur out of the order noted in the figures. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function. Additionally, each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" includes, but is not limited to portable or fixed storage devices, optical storage devices, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a subsystem, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral devices.

In the following description, certain terminology is used to describe certain features of one or more embodiments of the invention.

The term "presentation device" refers to any smart device, system or infrastructure capable of playing multimedia.

The term "onsite node" refers to software and associated hardware responsible for receiving time code or other relevant data from media servers, or other local devices, standardizing and transmitting it to the remote application program interface.

The term "multimedia" refers to any visual, audio, olfactory or other physical expression or communication capable of being sensed by a natural person.

The term "media server" refers to a system intended to display or assist in the display of media to an audience, such as a video playback device, show control system or operator-controlled cueing device.

Various embodiments provide a system for synchronization of special access needs to smart devices. One embodiment of the present invention provides a system for synchronization of special access needs smart devices. In another embodiment, there is provided a method for using the system. The system and method will now be disclosed in detail.

Referring now to FIG. 1, there is shown a flowchart diagram of an automatic personal enhancement system 100 that is tailored to each user's special access needs using hardware that a user already possesses and is familiar, without additional software, according to one embodiment of the present invention. The system 100 comprises, at least one presentation device 102, wherein the at least one presentation device 102 is a multimedia device. At least one multimedia server 112 operably connected to the at least one presentation device 114. At least one transmission device 104, wherein the at least one transmission device 104 is configured to transmit multimedia and other information wired, wirelessly, or both wired and wirelessly, and is operably connected to the multimedia server 112. A fleet management subsystem 116 is operably connected to the transmission device 104. A content database server that is operably connected to the fleet management subsystem. A web server operably connected to the fleet management subsystem 116 and the content database server.

The multimedia server comprises instructions to send time code or other relevant program data to the onsite node, that transmits data to the cloud-based application program interface for users to access. Also, the multimedia server comprises instructions to transmit industry time code from preexisting multimedia servers to cloud-based application program interface hosted on an onsite server, to synchronize the system 100 across multiple locations and devices.

The fleet management subsystem 116 comprises instructions for a secure container-based technology stack that enables a subtext manager to deploy, manage, and scale fleets of Internet of Things devices.

The system 100 provides an application program interface for receiving time codes, interfacing with the content database and outputting multimedia to the user's smart device.

The static web server is used for hosting content for the users.

There is also an administration web application for content management onsite node software, with an application program interface allows the user to connect without additional software.

The protocol for the time code message may need specification depending on the multimedia server.

Advantageously, the system 100:

works with the majority of major show control subsystems.

is capable of presenting multiple languages.

is scalable to multiple shows of different sizes including large-scale architectural projection mapping and smaller museum kiosks.

The multimedia server sends a real-time time-code to the onsite node, over a private local area network and is capable of transmitting multimedia content to users devices. The at least one onsite node rate-limits and standardizes messages and transmits them to the application program interface over the Internet. Users connect to the website, by scanning a QR code, bar code or other means known in the industry, and selecting the user's desired language that opens a streaming connection to the application program interface and the show control subsystem. When the application program interface receives a new time-code, it looks up the appropriate multimedia in the database and propagates it to the connected users. Venues can update the content of the database using a separate administration web base application.

As can be seen, unlike other products on the market, the present invention does not require a downloadable application. Additionally, the system 100 does not require an operator to run the enhancement system 100.

The system 100 is unlike any other product or service on the market. The system 100 provides an affordable, easy to use, closed enhancement system 100 for immersive environments that is connected directly to a show control subsystem in order to run without an operator and delivers multimedia content enhancements for both impaired and non-impaired users, along with translation services directly to the user's smart device without the need of downloading an extra application to the smart device.

The system 100 improves the user experience, prevents interference with show content and allows enhancement for events where a display surface is not feasible. It benefits the venue by significantly reducing initial capital expenditure, minimal modification to existing show-control systems as well as operational and maintenance expenses (users use their own smart devices and data connection). It also permits easy updating of content and features (synchronized audio, second-screen information, etc.).

Figure 2:
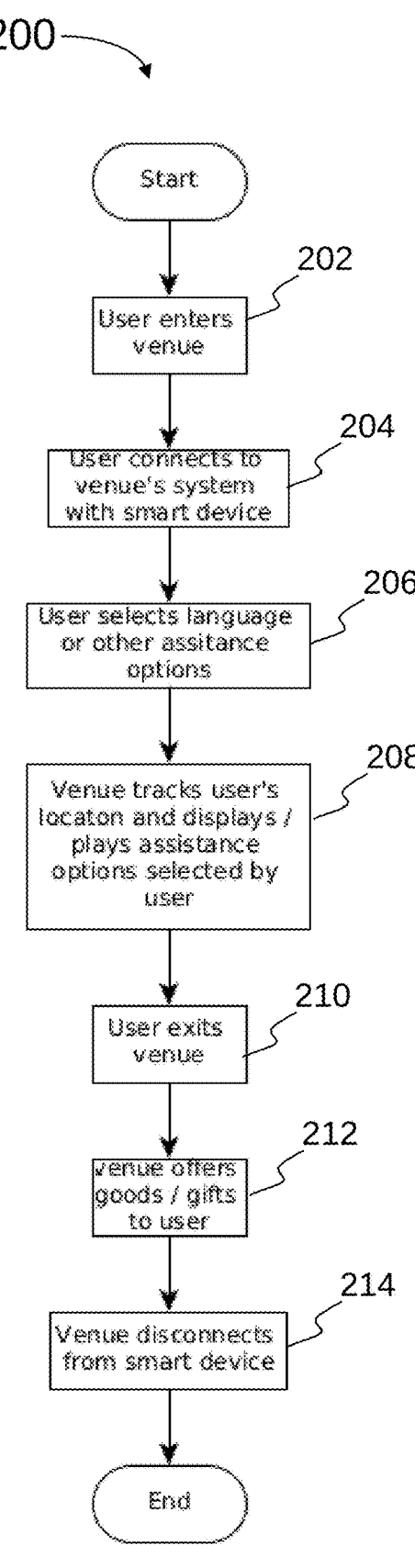

Referring now to FIG. 2, there is shown a flowchart diagram of a user experience 200 using the system 100. First, a user enters 202 a venue equipped with the system 100 described herein. Then, the user connects 204 to the venue's show control subsystem. The connection can be made by scanning a code provided by the venue or in any other method known or contemplated in the art. Preferably, the connection to the venue's show control subsystem is wireless. Next, the user selects their desired language 206 for the multimedia presented by the venue. Optionally, other user assistance options are made available so that any user is able to maximize their personal experience at the venue, whether it is closed captioning, a louder volume, a direct connection between the user's smart device and the user's hearing aides, or visual aides, all of which are contemplated in this disclosure. Then, the user's smart device can be tracked 208 by the system 100 for automatically playing multimedia associated with the location in the venue when in proximity to the user's smart device. Optionally, the user can manually active or deactivate the personalized enhancements. Also, prior to exiting the venue, gifts, tickets, discounts and other offers can optionally be displayed 212 to the user for immediate purchase or redemption at a later date to maximize the venue's revenue. Finally, the user exits 210 the venue and tracking is stopped, the system 100 disconnects 214 from the user's smart device, and the user experience ends.

Figure 3:
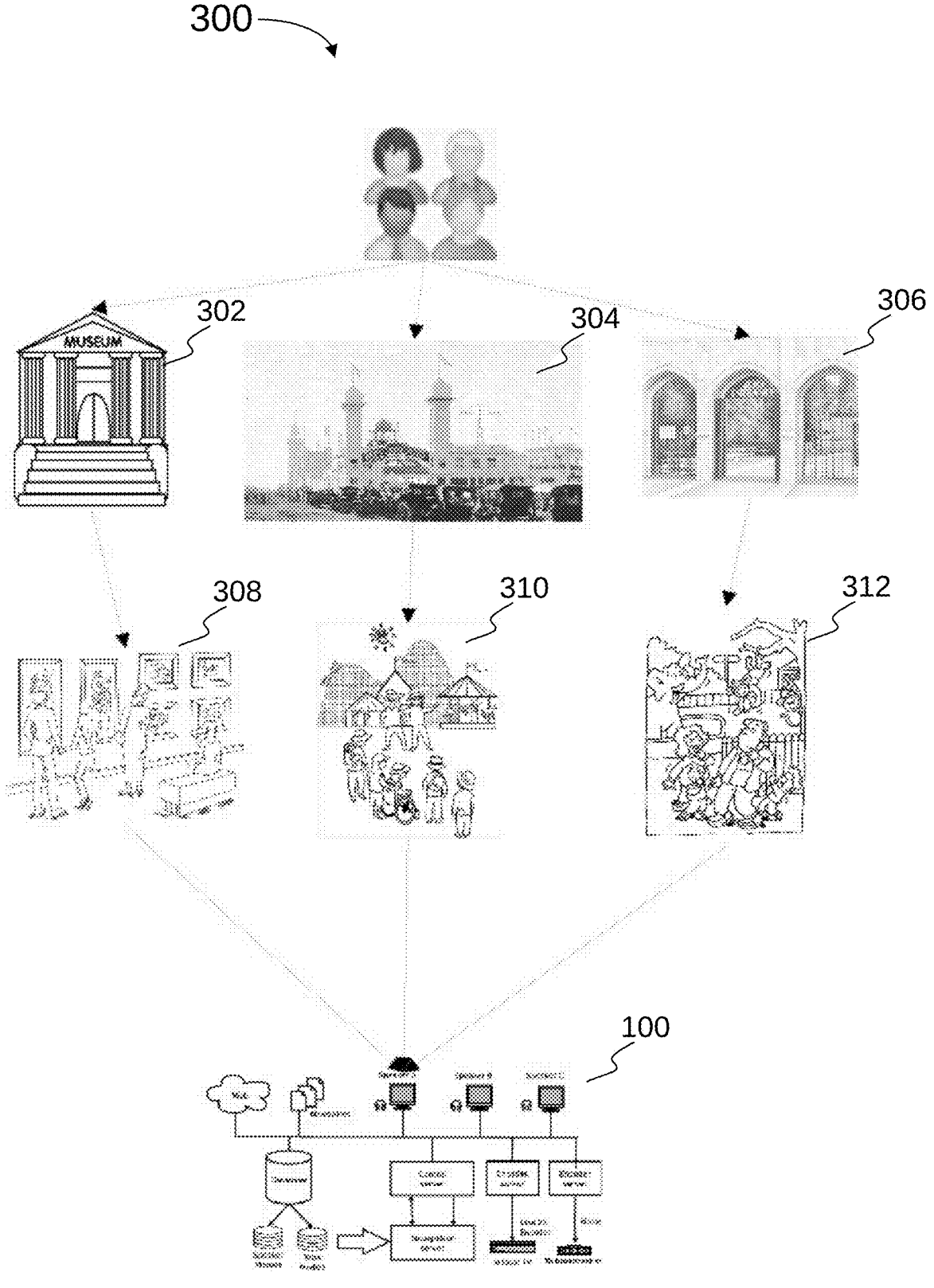
FIG. 3 is a workflow diagram of various venues using the system of FIG. 1.

Referring now to FIG. 3, there is shown a workflow diagram of various venues 300 using the system 100. As can be seen, there are shown exemplars of various venues where the present invention can be useful. This is not meant to be limiting, only examples. Those with skill in the art with reference to this disclosure will understand that there are many different venues where the present invention would be useful and valuable. For example, a museum 302 can have information displayed for all of the individual pieces on display with additional information that cannot be placed upon a plaque underneath or in front of the piece. In a corollary fashion, a gallery 308 can provide the artist's inspiration and interpretation of the piece being viewed by a user without needing to find the artist or the gallery owner to discuss. Additionally, the pricing information of the piece could optionally be shown/displayed to the user.

Amusement parks 304 and 310 can provide information about the rides and even display restrictions, wait times, to the user on the user's smart device. The user could find out more information about the ride, the history of the ride, thereby adding to the experience.

Zoos 306 and 312 can use the system 100 to provide more details about the animals that the user is viewing, other than, the generic information that can currently be displayed.

In all of the above venues, and more, there is an aspect of safety that can also be provided. For example, a deaf or hard of hearing user, can receive emergency alerts using the show control subsystem. Even non-impaired users could be informed of any emergency situation and where to go or how to proceed as an additional communication method for the venue.

Figure 4:
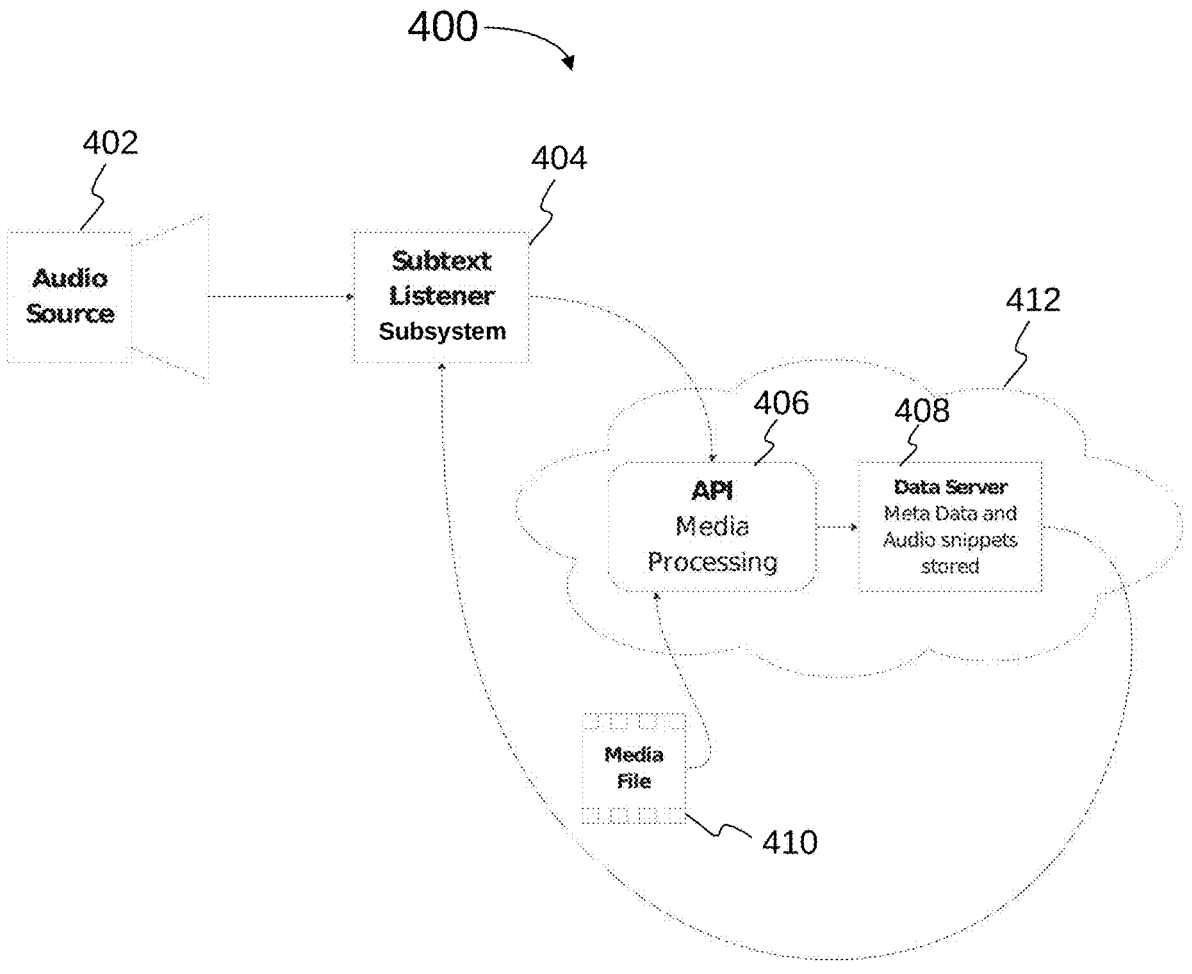
FIG. 4 is a diagram of a multimedia source synchronization to subtitle subsystem.

Referring now to FIG. 4, there is shown a diagram of a multimedia source synchronization to subtitle subsystem 400. The subtext listener subsystem 404 interprets timing based solely on interpreting the audio source 402 without the need for conventional programming. The media file 410, which is identical to audio source 402 is uploaded to the API 406 for analysis and processing into "snippets" and associated metadata. The snippets are downloaded by the listener subsystem 404, which begins processing the audio source 402 via its analog audio interface. The listener subsystem 404 regularly samples the audio source 402 and compares this sample to its library of snippets to develop a confidence rating using a cross-correlation algorithm. It then outputs a time code of the moment of highest correlation across all of the snippets to coordinate the audio source to the multimedia file 410.

As can be seen the multimedia source synchronization to subtitle subsystem comprises an audio source 402, a subtext listener subsystem 404 that is operably connected to the audio source 402, a multimedia processing subsystem 406 operably connected to the subtext listener subsystem 404, a data server 408 that is operably connected to the subtext listener subsystem 404 and the multimedia processing subsystem 408, and one or more than one multimedia file 410 that is operably connected to the multimedia processing subsystem 408. As will be understood by those will skill in the art with reference to this disclosure, the data server 408 and the one or more than one multimedia file 410 can be local, remote or both local and remote to the rest of the multimedia source synchronization to subtitle subsystem 400. This enables smaller venues that do not have data centers to use the system 100 without investing into infrastructure save space, maintenance and money while still providing an incredible personal experience for all visitors.

What has been described is a new and improved system for an automatic personal enhancement system 100 that is tailored to each user's special access needs using hardware that a user already possesses and is familiar, without additional software, overcoming the limitations and disadvantages inherent in the related art.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

What is claimed is:

1. An automatic personal enhancement system that is tailored to each user's special access needs comprising:
   a. at least one presentation device, wherein the at least one presentation device is a multimedia device;
   b. at least one onsite node operably connected to the at least one presentation device, wherein the at least one onsite node comprises a user protocol time code message protocol, and wherein the at least one onsite node sends a real-time time-code to the system, over a private local area network;
   c. at least one transmission device operably connected to the at least one onsite node, wherein the at least one transmission device is configured to transmit information to the onsite node wired, wirelessly, or both wired and wirelessly;

d. a fleet management subsystem that is operably connected to the at least one transmission device;
   e. at least one content database server that is operably connected to the fleet management subsystem;
   f. at least one smart device operably connected to at least one web server; and
   g. the at least one web server operably connected to the fleet management subsystem and the at least one content database server, wherein the at least one web server comprises instructions operable on one or more than one processor for:
   1) identifying a user entering a venue equipped with the system;
   2) connecting to the show control subsystem;
   3) selecting a language for multimedia pretensions from the show control subsystem;
   4) tracking the user's smart device with the personal enhancement system for automatically playing multimedia associated with the location in the venue in proximity to the user's smart device; and
   5) stopping the tracking and disconnecting the personal enhancement system from the user's smart device after the user exits the venue;
   wherein the system further comprises instructions for:
   interpreting timing based solely on listening to an incoming audio feed;
   synchronizing a media source with subtitles or other associated content without the need for onsite node programming or networking, where programming isn't feasible due to complexity, cost, where security is a concern due to legacy media, and where digital time codes are not an available;
   ingesting target media in advance;
   dividing the target media into snippets;
   creating metadata from the snippets;
   uploading the metadata to a data server; and
   listening to incoming audio over an analog input port, and the at least one onsite node downloading and comparing the incoming audio to the snippets and metadata; wherein the system regularly samples an incoming audio stream and compares the sample to a library of snippets to develop a confidence rating using a cross-correlation algorithm, and wherein the system outputs a time code of the moment of highest correlation across all of the snippets.

2. The system of claim 1, wherein the at least one onsite node comprises instructions operable on one or more than one processor to send a time code to a specific local internet protocol address for the user to access on the one or more than one smart device.

3. The system of claim 2, wherein the at least one onsite node further comprises instructions to:
   a. rate-limit and standardize messages and transmits the messages to an application program interface; and
   b. transmit an industry time code from preexisting onsite nodes to cloud-based application program interface hosted on a least one at least one presentation device, to synchronize the system across multiple physical locations.

4. The system of claim 1, wherein the fleet management subsystem comprises instructions operable on one or more than one processor for a secure container-based technology stack that enables a subtext manager to deploy, manage, and scale fleets of internet of things devices.

5. The system of claim 1, wherein the system further comprises an application program interface for receiving time codes, interfacing with the at least one content database and outputting multimedia to the user's smart device.

6. The system of claim 1, wherein the system further comprises instructions operable on one or more than one processor for at least one presentation device-less application program interface to connect users to the system without additional software added to the at least one smart device, and wherein the users connect to the at least one web server by scanning a QR code, a bar code or a RFID tag or an NFC device, and select a language that opens a streaming connection to the application program interface and the show control subsystem.

7. The system of claim 1, wherein an at least one onsite node rate-limits and standardizes messages and transmits them to the application program interface on the at least one web server.

8. The system of claim 1, wherein when the application program interface receives a new time-code, a multimedia file stored in the at least one content database server is propagated to the users connected smart device, wherein the multimedia file is coincident with the venue location.

9. The system of claim 1, wherein the system is automatic and operates without an operator and delivers multimedia content enhancements for both impaired and non-impaired users, along with translation services directly to the user's smart device without the need of downloading an extra application to the smart device.

10. The system of claim 1, wherein connecting to the show control subsystem is made by the user scanning a code provided by the venue with a user's smart device.

11. The system of claim 1, wherein the connection to the show control subsystem is wireless.

12. The system of claim 1, wherein other user assistance options are made available so that any user is able to maximize the personal experience at the venue, where the other user assistance options are selected from the group consisting of closed captioning, volume, and vibration.

13. The system of claim 1, wherein a direct connection between the user's smart device and the user's hearing aids, or visual aids.

14. The system of claim 1, wherein the user can manually activate or deactivate the automatic personalized enhancements.

15. The system of claim 1, wherein prior to exiting the venue, gifts, tickets, discounts and other offers can be displayed to the user on the smart device for immediate purchase or redemption at a later date.

16. The system of claim 1, wherein impaired users that are deaf, hard of hearing, or blind can receive emergency alerts using the show control subsystem presenting auditory, vibratory and visual alerts.

17. The system of claim 1, wherein both impaired and non-impaired users are informed of any emergency situation and where to go or how to proceed as an additional communication method for the venue.

18. A method for using the automatic personal enhancement system that is tailored to each user's special access needs, the method comprising the steps of:

a. entering a venue equipped with the system;

b. connecting to the show control subsystem, wherein the connection can be made by scanning a code provided by the venue with a user's smart device;

c. selecting a language for multimedia presentations from the show control subsystem;

d. tracking the user's smart device the personal enhancement system for automatically playing multimedia associated with the location in the venue in proximity to the user's smart device; and e. exiting the venue, wherein tracking is stopped and the personal enhancement system disconnects from the user's smart device;

f. interpreting timing based solely on listening to an incoming audio feed;

g. synchronizing a media source with subtitles or other associated content without the need for onsite node programming or networking, where programming isn't feasible due to complexity, cost, where security is a concern due to legacy media, and where digital time codes are not an available;

h. ingesting target media in advance;

i. dividing the target media into snippets;

j. creating metadata from the snippets;

k. uploading the metadata to a data server; and l. listening to incoming audio over an analog input port, and the at least one onsite node downloading and comparing the incoming audio to the snippets and metadata; wherein the system regularly samples an incoming audio stream and compares the sample to a library of snippets to develop a confidence rating using a cross-correlation algorithm, and wherein the system outputs a time code of the moment of highest correlation across all of the snippets.

* * * * *